Sept. 6, 1960 E. R. ANDERSON ET AL 2,951,310
INSECT DESTROYER
Filed Oct. 9, 1958 2 Sheets-Sheet 1
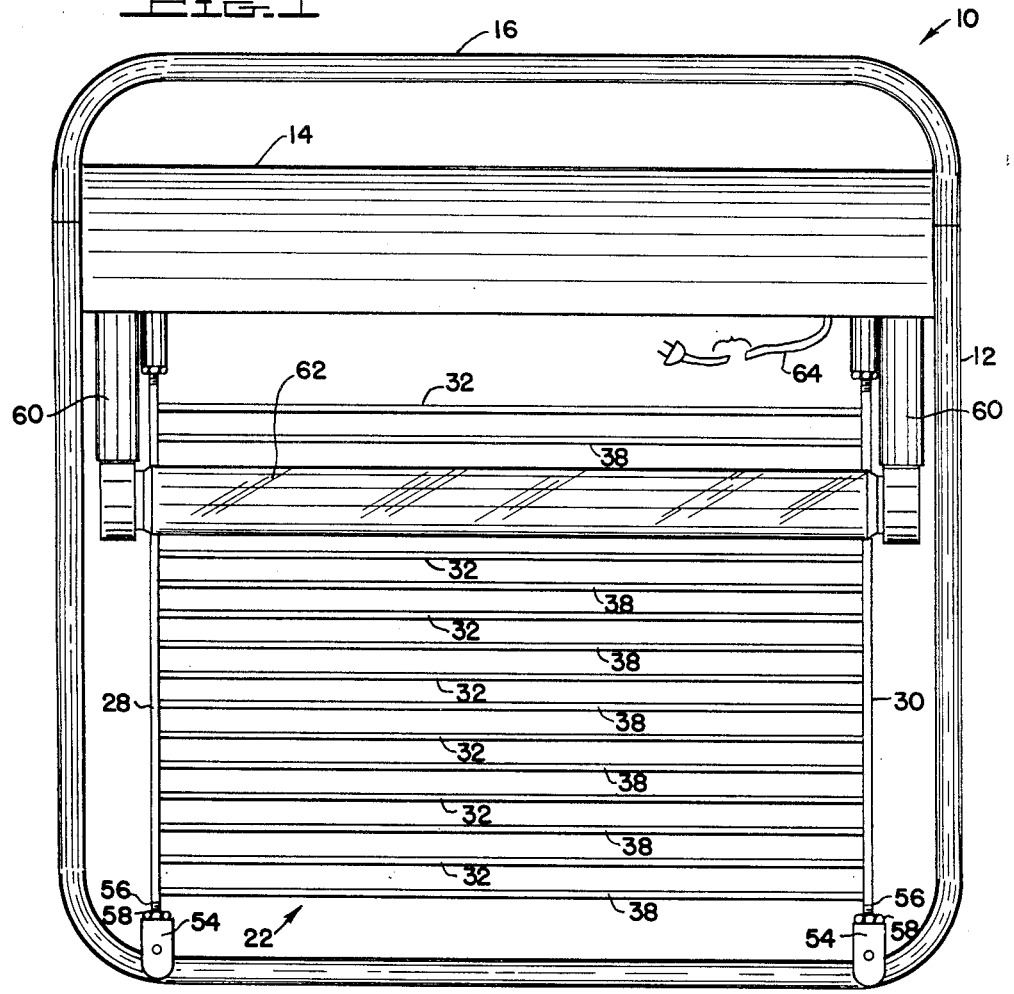
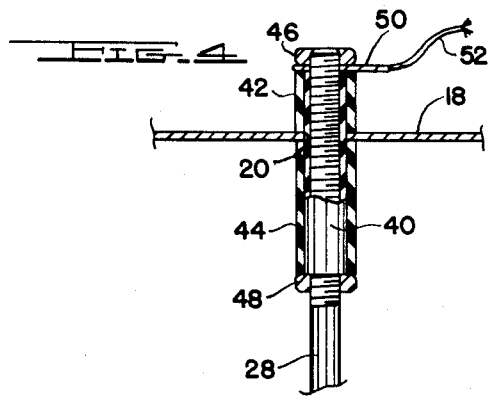
INVENTOR.
EUGENE R. ANDERSON,
RICHARD G. SOPER, AND
BY FLOYD LEE DAVIS
FINN G. OLSEN
ATTORNEY Sept. 6, 1960        E. R. ANDERSON ET AL        2,951,310
                        INSECT DESTROYER
Filed Oct. 9, 1958                              2 Sheets-Sheet 2
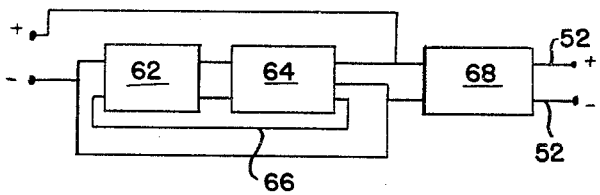
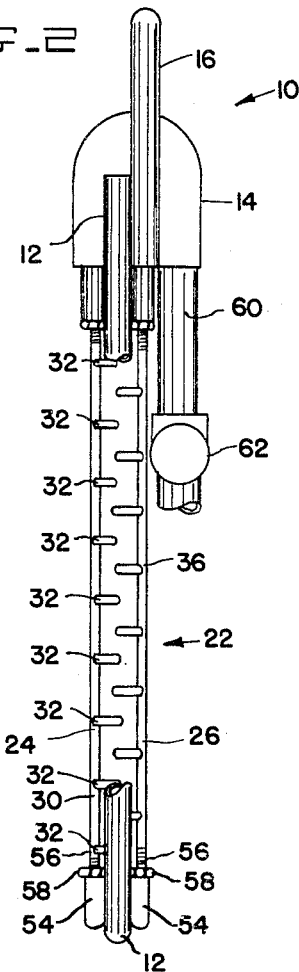
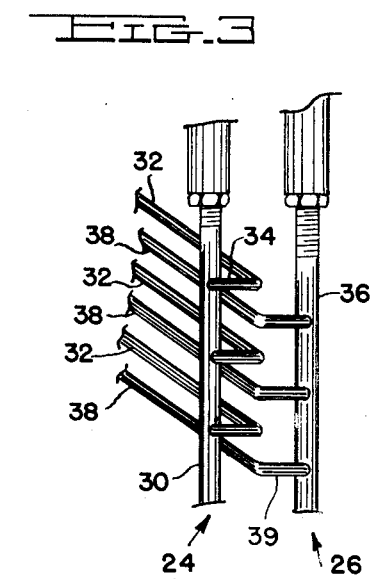
INVENTOR.
EUGENE R. ANDERSON,
RICHARD G. SOPER, AND
BY FLOYD LEE DAVIS
FINN G. OLSEN
ATTORNEY

United States Patent Office 2,951,310
Patented Sept. 6, 1960

2,951,310
INSECT DESTROYER

Eugene R. Anderson, Dearborn, Richard G. Soper, Wayne, and Floyd Lee Davis, Dearborn, Mich., assignors to Electro-Lads Mfg. Co., Dearborn, Mich., a corporation of Michigan Filed Oct. 9, 1958, Ser. No. 766,331

10 Claims. (Cl. 43—112)

The present invention relates generally to an electric insect destroyer and more particularly to improvements including the electric grid of the insect destroyer and the insulator assemblies used in mounting the grid.

One of the conventional types of electric insect destroyers now in use employs a grid formed by a pair of parallel vertical strips or headers through which a plurality of parallel horizontal conductors project. Such a construction gives satisfactory performance to a limited extent. One of the problems raised in using this conventional structure is that the header or strip at each end must be insulated from alternate conductors to prevent a short circuit from being formed, and it is found that such short circuit may easily occur by debris, or the like, laying against the strip. Thus, it is essential that the conventional unit be mounted with the strips in a vertical position if the best results are to be obtained.

Also, this defect of the conventional insect destroyer limits its width, because the conductors will sag if the span between the strips is too great. Other strips may be inserted intermediate the ends of the conductors, but this further aggravates the problem of avoiding undesired short circuits.

It is the principal object of the present invention to provide an improved electric insect destroyer which overcomes the shortcomings of the conventional electric insect destroyers now in use.

It is another object of the present invention to provide an improved grid for an insect destroyer, said grid being constructed and arranged as two separate sections which are adapted to be mounted in electrically insulated relation adjacent one another thereby eliminating the insulating problems existing when a unitary grid is employed.

It is still another object of the present invention to provide an improved grid of the foregoing character which will function equally effectively irrespective of the position in which it is mounted.

It is still another object of the present invention to provide a grid of the foregoing character wherein the separate sections are constructed the same thereby simplifying manufacturing and assemblying operations and reducing the cost of construction.

It is still another object of the present invention to provide an improved electric insect destroyer which includes a grid of the foregoing character and wherein the sections of the grid can be moved relative to one another thereby allowing the space between adjacent electric conductors of opposite polarity to be selectively varied.

It is still another object of the present invention to provide an improved electric insect destroyer of the foregoing character which has insulator assemblies for supporting the grid, such insulator assemblies providing the adjustable features for the grid.

Other objects of this invention will appear in the following description and appended claims, reference being had to the accompanying drawings forming a part of this specification wherein like reference characters designate corresponding parts in the several views.

In the drawings:

Figure 1 is a front elevation of an electric insect destroyer embodying one form of the present invention;

Figure 2 is a side elevation of the illustrated embodiment with portions partially removed;

Figure 3 is a fragmentary perspective view of the grid showing details of its construction;

Figure 4 is an enlarged fragmentary view, partly in section, of one of the insulator assemblies used; and Figure 5 schematically illustrates an electric circuit that may be used with the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, a more detailed description of the invention will be given. The illustrated electric insect destroyer 10 has a tubular frame portion 12 across which is mounted a transformer housing 14. A second tubular frame portion 16 is mounted so as to extend above the housing 14. The frame portions 12 and 16 provide a suitable means for carrying or mounting the insect destroyer 10 in any desired position.

The transformer housing 14 is preferably made from sheet metal and has a panel 18, Figure 4, for its bottom wall. The panel 18 has perforations or holes therein, one of which is shown at 20, for use in mounting the grid 22 in a manner to be described hereinafter.

The grid 22 has two opposed sections 24 and 26 which are mounted in spaced relation and are similarly constructed so that, if desired, they can be interchangeable, thereby simplifying manufacturing operations. Section 24 has two vertical electric feeder rods 28 and 30 and a plurality of parallel transverse electric conductors 32. Each of the electric conductors 32 is deflected out of the plane containing the feeder rods 28 and 30 by short offset portions, such as are shown at 34, Figure 3, so that the intermediate portions of the electric conductors 32 are in a common plane extending parallel to the plane containing feeder rods 28 and 30.

The section 26 is similar to the above described section 24 and also has two electric feeder rods, only one of which can be seen at 36. Electric conductors 38 extend between the feeder rods 36 and are offset at their ends as can be seen at 39, Figure 3. The amount of offset for sections 24 and 26 is the same and the feeder rods 28, 30 and 36 are positioned so that the intermediate portions of the electric conductors 32 and 38 will be in a common plane but in alternating position. Thus, it can be seen that the two sections 24 and 26 are mechanically separate thereby greatly reducing undesired short circuits between these parts.

The sections 24 and 26 are each independently mounted from the lower panel 18 of housing 14 as will be described with particular reference to Figure 4. As there shown the feeder rod 28 is threaded on its upper portion and extends through the aperture 20. A dielectric sleeve 40, which has a sliding fit, encloses the major portion of the threaded end of feeder rod 28, thereby insulating the feeder rod 28 from the panel 18. A pair of additional dielectric sleeves 42 and 44 fit over the first dielectric sleeve 40 and the adjacent ends of the dielectric sleeves 42 and 44 abut against opposite surfaces of the panel 18, thereby acting as clamps for retaining the entire insulating assembly and feeder rod 28 in place relative to panel 18. Lock nuts 46 and 48 are threadedly connected to the feeder rod 28 at opposite ends of the sleeves 40, 42 and 44, thereby holding them in their clamping positions.

By virtue of the insulating assembly described above, the feeder rod can be moved axially with respect to the panel 18 merely by turning the lock nuts 46 and 48. This will have the effect of moving the electric conductors 32 to the same extent.

The upper ends of the four feeder rods have the same insulator assembly as is described above, and in addition, one feeder rod of each section 24 and 26 will have an electric lug 50, Figure 4, connected to the feeder rod 28 and to which an electric conductor 52 is connected. These two conductors 52 form part of a high voltage circuit which will subsequently be described.

The lower ends of the four feeder rods are mounted in insulator members 54 by means of the threaded lower ends 56 which are held by the lock nuts 58 which are retained in the dielectric base of each of the insulator members 54. When it is desired to move one of the sections 24 or 26 vertically, this can be accomplished by turning the lock nuts 46, 48 and 58 associated with the section to be adjusted. Thus, the spacing between the adjacent electric conductors 32 and 38 can be varied to suit the required conditions for most effectively destroying insects and bugs.

Also extending from the housing 14 is a conventional black light fixture 60 including the black light lamp or tube 62 for attracting bugs or insects in the vicinity of the electric insect destroyer 10. An electric cord 64 also leads from the housing 14 for insertion in a conventional electric outlet of the home having 115 volt, 60 cycle current.

Referring to Figure 5, a simple schematic diagram is shown illustrating the component parts in the electric circuit. The black light lamp 62 is shown connected to a ballast or starter 64 by a suitable 115 volt electric circuit 66. Also connected across the 115 volt circuit is a step-up transformer 68, which is carried within the housing 14. The transformer is adapted to step up the potential across the lines 52, which are connected respectively to the opposite grid sections 24 and 26, to approximately 4,000 volts. Thus, if a bug or insect comes sufficiently close to the adjacent electric conductors 32 and 38, a circuit will be closed through such bug or insect, thereby destroying it.

From the foregoing it will be observed that there are no strips, or the like, such as are found in conventional units on which the debris from the destroyed bugs or the like can be deposited. Thus, unnecessary short circuits and messy grids are eliminated. Furthermore, the grid can be turned in any angle without affecting its operation. Thus, if desired, the unit illustrated in Figure 1 could be rotated ninety degrees with the electric conductors 32 and 38 in a vertical position and the feeder rods 28 and 30 in a horizontal position and the unit would function equally well. This feature also permits a grid of considerable length because the electric conductors 32 and 38 can then be mounted in a vertical position and there will be no danger of any of them sagging so as to cause undesired short circuits.

Having thus described our invention, we claim:

1. An electric insect destroyer comprising a normally vertically disposed open frame having a housing extending across the upper portion thereof, a transformer mounted in said housing, a grid, electric insulators, supporting said grid between said housing and the lower portion of said frame, said grid occupying the major portion of the area within said frame, said grid having a pair of opposed sections, each section having vertical electrically conductive feeder rods at its opposite ends on the upper and lower ends of which the electric insulators are carried and a plurality of horizontal electric conductors extending in parallel relation between the feeder rods and deflected uniformly out of the plane containing said feeder rods to a common second plane parallel with the first plane, said sections being in parallel relation and mounted so that their respective electric conductors are generally in said common second plane and in alternate arrangement, and electric conductors connected between said transformer and said sections so that when an insect bridges adjacent pairs of electric conductors a high voltage circuit will be closed momentarily thereby destroying such insect.

2. An electric insect destroyer comprising a normally vertically disposed open frame having a housing extending across the upper portion thereof, a transformer mounted in said housing, a grid, electric insulators, supporting said grid between said housing and the lower portion of said frame, said grid occupying the major portion of the area within said frame, said grid having a pair of opposed sections, each section having vertical electrically conductive feeder rods at its opposite ends on the upper and lower ends of which the electric insulators are carried and a plurality of horizontal electric conductors extending in parallel relation between the feeder rods and deflected uniformly out of the plane containing said feeder rods to a common second plane parallel with the first plane, said sections being in parallel relation and mounted so that their respective electric conductors are generally in said common second plane and in alternate arrangement, at least one of said sections being vertically adjustable in its insulators so that the spacing between the horizontal electric conductors can be varied selectively, and electric conductors connected between said transformer and said sections so that when an insect bridges adjacent pairs of electric conductors a high voltage circuit will be closed momentarily thereby destroying such insect.

3. An electric insect destroyer comprising a housing, electric insulators, a grid suspended from said electric insulators supported by said housing, said grid having a pair of opposed sections, each section having vertical electrical feeder rods at opposite ends with the upper ends of the rods being connected to said insulators and each section having a plurality of parallel electric conductors connected at their opposite ends to said feeder rods and with their intermediate portions deflected uniformly out of the plane containing the feeder rods to a common second plane parallel with the first plane, said sections being in parallel relation and mounted so that their respective electric conductors are generally in said common second plane and in alternate arrangement, at least one of said sections being vertically adjustable in its insulators so that the spacing between the parallel electric conductors can be varied selectively, a transformer in said housing, and electric conductors connected between said transformer and said sections so that when an insect bridges adjacent pairs of electric conductors a high voltage circuit will close thereby destroying said insect.

4. An electric insect destroyer comprising a normally vertically disposed frame member, a transformer housing member connected to and extending between opposite edges of said frame member, electric insulators, a grid supported on said electric insulators between said housing and the lower edge of said frame member, said grid having a pair of opposed sections, each section having a pair of spaced electrical feeder rods and a plurality of parallel transverse electric conductors connected at their ends to the feeder rods and having their intermediate portions deflected uniformly out of the plane containing the feeder rods to a common second plane parallel with the first plane, said sections being in parallel relation and mounted so that their respective electric conductors are generally in said common second plane and in alternate arrangement, said feeder rods being mounted at opposite ends and being axially adjustable in said electric insulators which are supported respectively on said housing member and the lower edge of said frame member, a transformer in said housing member, and electric conductors connected between said transformer and said sections so that when an insect bridges adjacent pairs of electric conductors a high voltage circuit will close thereby destroying said insect.

5. In an electric insect destroyer, a grid comprising a pair of opposed sections, each section having a pair of spaced electrical feeder rods and a plurality of parallel transverse electric conductors connected at their ends to said feeder rods and having their intermediate portions deflected uniformly out of the plane containing the feeder rods to a common second plane parallel with the first plane, said sections being mounted in parallel relation so that their respective electric conductors are generally in said common second plane and in alternate arrangement.

6. In an electric insect destroyer having a transformer housing and a grid with two sections independently suspended by the respective feeder rods thereof from an apertured panel of the housing, an insulator assembly between a feeder rod of each section and said apertured panel comprising a first dielectric sleeve fitting through an aperture of said panel and over one end portion of one of said rods, a pair of dielectric sleeves fitting in endwise relation over the first sleeve and engaging therebetween opposite surfaces of said panel, an electric lug connected to said rod above said sleeves, and lock nuts threadedly connected to said rod below said sleeves and above said electric lug for supporting said rod, electric lug and dielectric sleeves in a suspended insulated position under said housing panel and for allowing axial adjustment of the rod relative to the panel by turning said lock nuts.

7. In an electric insect destroyer having a transformer housing with an apertured panel forming one wall thereof, the combination of a grid having a pair of opposed sections, each section having a pair of spaced electrical feeder rods and a plurality of parallel transverse electric conductors connected at their ends to said feeder rods and having their intermediate portions deflected uniformly out of the plane containing the feeder rods to a common second plane parallel with the first plane, said sections being mounted in parallel relation so that their respective electric conductors are generally in said common second plane and in alternate arrangement, and insulator assemblies mounted between the ends of said feeder rods and the apertured panel, each insulator assembly having a first dielectric slectric sleeve fitting through an aperture of said panel and over one end portion of one of said rods, a pair of dielectric sleeves fitting in endwise relation over the first sleeve and engaging therebetween opposite surfaces of said panel, an electric lug connected to said rod above said sleeves, and lock nuts threadedly connected to said rod below said sleeves and above said electric lug for supporting said rod, electric lug and dielectric sleeves in an insulated position from said apertured panel and for allowing axial adjustment of the rod relative to the panel by turning said lock nuts.

8. In an electric insect destroyer having a transformer housing with an apertured panel forming one wall thereof, the combination of a grid having a pair of opposed parallel sections, each section having a pair of spaced feeder rods and a plurality of parallel transverse electric conductors, and insulator assemblies mounted respectively between the feeder rods of each section and the apertured panel, each insulator assembly having a first dielectric sleeve fitting through an aperture of said panel and over one end portion of its associated rod, a pair of dielectric sleeves fitting in endwise relation over the first sleeve and engaging therebetween opposite surfaces of said panel, an electric lug connected to said rod above said sleeves, and lock nuts threadedly connected to said rod below said sleeves and above said electric lug for supporting said rod, electric lug and dielectric sleeves in an insulated position from said apertured panel and for allowing axial adjustment of the rod relative to the panel by turning said lock nuts.

9. In an electric insect destroyer having a transformer housing with an apertured panel forming one wall thereof, the combination of a grid having a pair of opposed parallel sections, each section having a pair of spaced feeder rods and a plurality of parallel transverse electric conductors, and insulator assemblies between a feeder rod of each section and the apertured panel, each insulator assembly having dielectric properties insulating said feeder rod from said panel and adjustment means for adjusting the rod axially with respect to the apertured panel.

10. In an electric insect destroyer having a normally vertically disposed open frame with a transformer housing extending across the upper portion thereof and with said housing having an apertured panel for its lower wall, the combination of a grid having a pair of spaced parallel feeder rods and a plurality of parallel transverse electric conductors, insulator assemblies between the upper ends of said feeder rods and the apertured panel, each insulator assembly having a first dielectric sleeve fitting through an aperture of said panel and over one end portion of the rod, a pair of dielectric sleeves fitting in endwise relation over the first sleeve and engaging therebetween opposite surfaces of said panel, and lock nuts threadedly connected to said rod below and above said sleeves and holding said sleeves and said rod together, and insulator members connected to the lower ends of said feeder rods, the insulator members attached to one of said sections being positioned on one side of said frame and the insulator members attached to the other section being positioned on the other side of said frame, said insulator members being connected together to prevent lateral displacement.

References Cited in the file of this patent

UNITED STATES PATENTS

| | | |
|---|---|---|
| 1,845,699 | Brown | Feb. 16, 1932 |
| 1,952,795 | Frost | Mar. 27, 1934 |
| 2,061,458 | Folmer et al. | Nov. 17, 1936 |